(12) United States Patent
Heck et al.

(10) Patent No.: US 10,308,550 B2
(45) Date of Patent: Jun. 4, 2019

(54) DEVICE INCLUDING A RADIATION EMITTER FOR APPLYING RADIATION TO A TARGET, AND RELATED METHODS

(71) Applicants: Heraeus Noblelight America LLC, Gaithersburg, MD (US); Heraeus Noblelight GmbH, Hanau (DE)

(72) Inventors: Johanna Heck, Rodenbach (DE); Darrin Leonhardt, Gaithersburg, MD (US); David Sprankle, Hagerstown, MD (US); Michael Peil, Otzberg (DE); Jörg Diettrich, Erlensee (DE)

(73) Assignees: Heraeus Noblelight America LLC, Gaithersburg, MD (US); Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 15/917,000

(22) Filed: Mar. 9, 2018

(65) Prior Publication Data

US 2018/0257983 A1    Sep. 13, 2018

Related U.S. Application Data

(60) Provisional application No. 62/469,841, filed on Mar. 10, 2017.

(51) Int. Cl.
*B05D 3/02* (2006.01)
*B05D 3/06* (2006.01)
(Continued)

(52) U.S. Cl.
CPC ............. *C03C 25/26* (2013.01); *B05D 3/067* (2013.01); *B05D 7/20* (2013.01); *F26B 3/28* (2013.01);
(Continued)

(58) Field of Classification Search
CPC .......... C03C 25/26; B05D 3/067; B05D 7/20; F26B 3/28; F26B 13/002; G02B 1/048;
(Continued)

(56) References Cited

U.S. PATENT DOCUMENTS

| 4,710,638 A | 12/1987 | Wood |
| 8,604,448 B2 | 12/2013 | Hartsuiker et al. |

(Continued)

FOREIGN PATENT DOCUMENTS

JP          04295032          10/1992

OTHER PUBLICATIONS

International Search Report and Written Opinion from Corresponding International Patent Application No. PCT/US2018/021822 dated Jun. 21, 2018.

*Primary Examiner* — Nicole M Ippolito
*Assistant Examiner* — Hanway Chang
(74) *Attorney, Agent, or Firm* — Stradley Ronon Stevens & Young, LLP

(57) ABSTRACT

A device for applying radiation to a target is provided. The device includes a radiation emitter to emit electromagnetic radiation having a peak emission wavelength in the range from 10 nm-1 mm, and a first reflector that extends in a length direction with a concave cross section. The first reflector defines a cavity area having a perimeter, and includes an inward facing reflective border for at least 50% of the perimeter of the cavity area. Radiation is provided to the cavity area with an intensity distribution I and a maximum intensity $I_{max}$. The cavity area includes a focal area defined by all points at which a normalized intensity $I/I_{max}$ is greater than 0.2. A width of the focal area is 0.0001-0.5 times a width of the cavity area.

20 Claims, 7 Drawing Sheets

(51) Int. Cl.
   *B05D 7/20* (2006.01)
   *F26B 3/28* (2006.01)
   *G02B 1/04* (2006.01)
   *G02B 6/02* (2006.01)
   *C03C 25/26* (2018.01)
   *F26B 13/00* (2006.01)
   *G02B 19/00* (2006.01)

(52) U.S. Cl.
   CPC .......... *F26B 13/002* (2013.01); *G02B 1/048* (2013.01); *G02B 6/02033* (2013.01); *G02B 19/0023* (2013.01); *G02B 19/0066* (2013.01); *G02B 19/0095* (2013.01); *B05D 3/029* (2013.01)

(58) Field of Classification Search
   CPC .......... G02B 6/02033; G02B 19/0023; G02B 19/0066; G02B 19/0095
   USPC .............................. 250/492.1, 492.2, 492.3
   See application file for complete search history.

(56) References Cited

U.S. PATENT DOCUMENTS

| | | |
|---|---|---|
| 2007/0081336 A1 | 4/2007 | Bierhuizen et al. |
| 2015/0028020 A1 | 1/2015 | Childers |

DEVICE INCLUDING A RADIATION EMITTER FOR APPLYING RADIATION TO A TARGET, AND RELATED METHODS

CROSS-REFERENCE TO RELATED APPLICATION

This application claims the benefit of U.S. Provisional Patent Application No. 62/469,841, filed Mar. 10, 2017, the contents of which are incorporated herein by reference.

FIELD

The invention relates to a device and a process for applying radiation to a target, and more particularly, to a device including a radiation emitter for applying the radiation to a target.

BACKGROUND

A number of technological applications involve the application of electromagnetic radiation to a target. For example, electromagnetic radiation may be employed for heating, drying, curing (as in photopolymerization), or the like. One such application involves curing a precursor layer present on the outside of an object to produce a polymer coating on the object surface. One object to which such a polymer coating is applied is an elongate glass fiber.

A number of attempts have been made in the state of the art for providing processes for applying electromagnetic radiation to a target, often based on placing the object to be treated at the focal point of a reflector and thereby focusing applied radiation at that point.

For example, in U.S. Pat. No. 8,604,448, a device is disclosed for curing a coating on a fiber using ultraviolet (UV) light. The device includes a cavity of elliptical cross section bordered by mirrors. The fiber to be cured is located at the focal point of the ellipse and the UV light is focused there to effect curing of the target.

U.S. Pat. No. 4,710,638 also discloses a device for curing a coating on a fiber using radiation. Again, the curing chamber includes an elliptical cross section bordered by mirrors. The radiation source is positioned at one focal point of the ellipse and the target at the other. In this way radiation is focused on the target at a point.

However, it would be desirable to provide improved devices and processes for applying radiation to a target, for example, in the field of curing coatings on glass fibers with different radiation sources.

SUMMARY

According to an exemplary embodiment of the invention, a device for applying radiation to a target is provided. The device includes a radiation emitter configured to emit electromagnetic radiation having a peak emission wavelength in the range from 10 nm to 1 mm from a radiation emitting surface, and a first reflector that extends in a length direction and has a concave cross section perpendicular to the length direction. The first reflector defines a cavity area having a perimeter, and includes an inward facing reflective border for at least 50% of the perimeter of the cavity area. The radiation emitting surface is oriented so as to provide radiation to the cavity area with an intensity distribution I and a maximum intensity $I_{max}$. The cavity area includes a focal area defined by all points at which a normalized intensity $I/I_{max}$ is greater than 0.2. A width of the focal area is 0.0001 to 0.5 times a width of the cavity area. The width of the focal area and the width of the cavity area are determined along a line passing through a point of maximum intensity $I_{max}$ and which is parallel to a line joining two end points of the radiation emitting surface of the radiation emitter.

Methods of applying radiation to a target are also provided, using the device including the radiation emitter.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1:
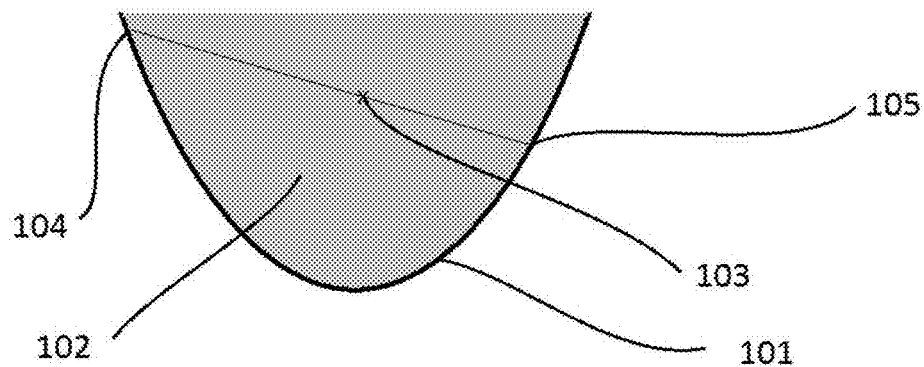
FIG. 1 is a cross section of a first reflector in accordance with an exemplary embodiment of the invention.

Aspects of the invention are generally based on the object of overcoming at least one of the problems encountered in the state of the art in relation to applying radiation to a target, for example, for the purpose of curing. A target of particular interest is a glass fiber including a coating.

More specifically, aspects of the invention are based on the object of providing a device for applying radiation to a target, and methods of applying radiation to a target. The radiation is desirably applied to the target with improved uniformity, high optical energy efficiency, high energy density, and/or high energy irradiance at the target. A further object of the invention is to facilitate the maintenance of a device for applying radiation to a target.

Various exemplary embodiments of the invention are described below.

Embodiment 1: a device for applying radiation to a target including a radiation emitter capable of emitting electromagnetic radiation having a peak emission wavelength in the range from 10 nm to 1 mm from a radiation emitting surface of the radiation emitter. Other exemplary ranges of the peak emission wavelength of the electromagnetic radiation are a range from 50 nm to 50 μm, and a range from 100 nm to 2 μm. The device also includes a first reflector that extends in a length direction and has a concave cross section perpendicular to the length direction. For example, the first reflector may extend at least the length of the radiation emitter. The concave cross section defines a cavity area having a perimeter and the first reflector provides an inward facing reflective border for at least 50% of the perimeter of the cavity area (with other exemplary ranges being at least 60% of the perimeter of the cavity area, or at least 70% of the perimeter of the cavity area). The radiation emitting surface is oriented so as to provide radiation to the cavity area with an intensity distribution I at the focal area with a maximum intensity $I_{max}$. In one example, the cavity area includes a focal area defined by all points at which the normalized intensity $I/I_{max}$ is greater than 0.2 (with other exemplary ranges for the normalized intensity being greater than 0.5, and greater than 0.8). The width of the focal area is 0.0001 to 0.5 times the width of the cavity area (with other exemplary ranges of the width of the focal area being 0.001 to 0.1 times the width of the cavity area, and the width of the focal area being 0.01 to 0.05 times the width of the cavity area). The width of the focal area and the cavity area are determined along a line passing through the point of maximum intensity $I_{max}$ and which is parallel to the line joining the two end points of the radiation emitting surface of the radiation emitter.

Embodiment 2: the device according to embodiment 1, wherein there is no focal point for the intensity I.

Embodiment 3: the device according to embodiment 1 or 2, wherein the area of the focal area is 0.00000001 to 0.30 times that of the cavity area, preferably 0.0000001 to 0.1 times, more preferably 0.000001 to 0.05 times.

Embodiment 4: the device according to any of embodiments 1-3, wherein the area of the focal area is in a range of 0.1 to 3000 mm², in a range of 0.5 to 500 mm², and/or in a range of 1 to 50 mm².

Embodiment 5: the device according to any of embodiments 1-4, wherein the width of the focal area is in a range of 0.01 to 50 mm, in a range of 0.1 to 30 mm, and/or in a range of 0.2 to 20 mm.

Embodiment 6: the device according to any of embodiments 1-5, wherein the width of the radiation emitting surface is greater than the width of the focal area (e.g., the width of the radiation emitting surface is at least 2 times as great as the width of the focal area, the width of the radiation emitting surface is at least 5 times as great as the width of the focal area, the width of the radiation emitting surface is at least 10 times as great as the width of the focal area), wherein the width of the radiation emitter is the extension of the radiation emitting surface in the cross section perpendicular to the shortest line between the point of maximum intensity $I_{max}$ and the radiation emitting surface.

Embodiment 7: the device according to any of embodiments 1-6, wherein for a circle centered at the point of $I_{max}$ and having a diameter equal to the width of the focal area, the minimum value of intensity on the circumference of the circle divided by the maximum value of intensity on the circumference of the circle is at least 0.2 (in other examples, at least 0.4, or at least 0.5).

Embodiment 8: the device according to any of embodiments 1-6, the intensity may be anisotropically distributed about the point of $I_{max}$. In one aspect of this embodiment, the focal area is extended in one direction and contracted in the perpendicular direction. One example shape of the focal area in this embodiment is an ellipse or substantially elliptical shape. In one aspect of this embodiment, for a circle centered at the point of $I_{max}$ and having a diameter equal to the width of the focal area, the minimum value of intensity on the circumference of the circle divided by the maximum value of intensity on the circumference of the circle is at most 0.5 (in other examples, at most 0.2, or at most 0.1).

Embodiment 9: the device according to any of embodiments 1-8, wherein the first reflector is characterized by one or more of the following criteria—(a) the concave cross section of the first reflector is not a conic section; (b) the concave cross section of the first reflector is piecewise made up of 2 to 1000 different conic sections (in other examples, 5 to 500 conic sections, 10 to 100 sections).

Embodiment 10: the device according to any of embodiments 1-9, further including a further reflector which provides an inward facing reflective border to part of the perimeter of the cavity area. The further reflector is preferably flat.

Embodiment 11: the device according to embodiment 10, wherein the further reflector has an aperture, wherein the radiation emitter is located outside the cavity area and the radiation emitting surface is oriented toward the aperture.

Embodiment 12: the device according to any of embodiments 1-11, further including a target chamber having a target chamber wall, wherein the target chamber wall is transparent to a peak emission wavelength of the radiation emitter, wherein at least 50% of the focal area is included in the target chamber (in other examples, at least 60%, at least 70%, or at least 80% of the focal area is included in the target chamber).

In connection with embodiment 12, the target chamber wall may transmits at least 50% (in other examples, at least 80%, or at least 95%) of intensity at the peak emission wavelength of the radiation emitter.

In connection with embodiment 12, the target chamber wall may be made of glass (e.g., quartz glass), plastic, or other materials.

In one aspect of this embodiment, the radiation emitter has 2 or more peak emission wavelengths. The chamber wall may be transparent at all of the peak emission wavelengths.

In a further aspect of this embodiment, the minimum value of intensity at the target chamber wall divided by the maximum value of intensity at the target chamber wall is at least 0.2 (in other examples, at least 0.4, or at least 0.5).

Embodiment 13: the device according to embodiment 12, wherein the focal area is completely included in the target chamber.

Embodiment 14: the device according to embodiment 12, wherein the target chamber includes an inert gas or wherein a flow of inert gas is provided through the target chamber.

Embodiment 15: The device according to any of embodiments 1-14, wherein one or more air ducts are provided in the perimeter of the cavity area.

In an example of embodiment 15, less than 10% (in other example, less than 5%, or less than 1%) of the perimeter of the cavity area in the cross section is made up of apertures through which air can enter the cavity area.

Embodiment 16: the device according to any of embodiments 1-15, wherein the normalized intensity $I/I_{max}$ in the cavity area has a maximum gradient of less than 1 per mm, preferably less than 0.5 per mm, more preferably less than 0.3 per mm.

Embodiment 17: the device according to any of embodiments 1-16, wherein the normalized intensity $I/I_{max}$ in the focal area has a maximum gradient of less than 0.5 per mm, preferably less than 0.4 per mm, more preferably less than 0.3 per mm.

Embodiment 18: the device according to any of embodiments 1-17, wherein a peak emission wavelength of the radiation emitter is in the range from 170 to 450 nm (other exemplary ranges include in the range from 180 to 430 nm, or in the range from 240 to 420 nm).

In one aspect of embodiment 18, the radiation emitter has a single peak emission wavelength. In another aspect of embodiment 18, the radiation emitter has two or more peak emission wavelengths.

Embodiment 19: the device according to any of embodiments 1-18, wherein a peak emission wavelength of the radiation emitter is in the range from 600 nm to 1 mm (other exemplary ranges include from 750 nm to 500 µm, and from 800 nm to 300 µm). In one aspect of embodiment 19, the peak emission wavelength is in the range from 700 nm to 10 µm (other exemplary ranges include from 750 nm to 5 µm, and from 800 nm to 1.5 µm).

In one aspect of embodiment 19, the radiation emitter has a single peak emission wavelength. In another aspect of embodiment 19, the radiation emitter has two or more peak emission wavelengths.

Embodiment 20: the device according to any of embodiments 1-19, wherein the radiation emitter is an array of 4 or more radiation emitters (in other examples the array includes 10 or more radiation emitters, and 20 or more radiation emitters).

Embodiment 21: the device according to any of embodiments 1-20, wherein the radiation emitter includes refractive optics to alter the divergence of radiation emitted from the radiation emitting surface. In one aspect of embodiment 20, the refractive optics decrease the divergence of the radiation. In another aspect of embodiment 20, the refractive optics increase the divergence, preferably to increase the amount of side illumination.

Embodiment 22: the device according to any of embodiments 1-21, further including one or two reflectors perpendicular to the length direction of the first reflector.

Embodiment 23: the device according to any of embodiments 1-22, further including a positioning system adapted and arranged for moving a target relative to the radiation emitter.

Embodiment 24: a method for applying radiation to a target includes the steps of (a) introducing a target into a device according to any of embodiments 1-23, and (b) applying radiation to the target from the radiation emitter.

Embodiment 25: the method according to embodiment 24, wherein at least part of the target is heated, sintered, cured, reacted, dried, melted or two or more thereof.

Embodiment 26: the method according to embodiment 24 or 25, wherein the target is an elongate body.

Embodiment 27: the method according to any of embodiments 24-26, wherein the process is a continuous process.

The term "peak emission wavelength", as used herein, refers to the wavelength of maximum spectral power density ([W/nm]). The peak emission wavelength may be determined according to the test method described herein.

Exemplary Aspects of the Device

As described herein, a device for applying radiation to a target includes: a radiation emitter; and (b) a first reflector having a concave cross section.

The radiation emitter and the first reflector may be oriented in such a way that the radiation emitter provides radiation flux to the cavity area defined by the concave cross section of the first reflector. In use, a target is located in the cavity area and is exposed to the radiation provided by the radiation emitter. Radiation arriving at the target can arrive there either directly from the radiation emitter, and/or following one or more reflections from the first reflector, or from other reflectors which may optionally be present.

The first reflector may be elongate in a length direction perpendicular to the cross section. Such a first reflector defines a 3-dimensional cavity, which may have a constant cross section along the length direction.

In certain embodiments of the invention, the perimeter of the cavity defined by the first reflector may be closed (e.g., by the first reflector itself, by the first reflector in combination with other components such as the radiation emitter or one or more further reflectors, or both). Closed in this context means that less than a certain percentage of the perimeter of the cavity area is open to a flow of air (e.g., less than 10%, less than 5%, less than 2%, etc.).

In certain embodiments, the 3-dimensional cavity is closed at one or both ends, for example, by a reflector. Closed in this context means that at least a certain percentage (at least 50%, at least 60%, at least 70%, etc.) of the cross sectional area at the end is bordered, for example, by a reflector. In one aspect of such embodiments, an aperture is left in one or both ends for introducing and/or removing a target configured for radiation with the radiation emitter.

Exemplary Aspects of the Radiation Emitter

Devices according to aspects of the invention include a radiation emitter. The radiation emitter may be capable of emitting electromagnetic radiation having a peak emission wavelength in the range from 10 nm to 1 mm from a radiation emitting surface of the radiation emitter. Other exemplary ranges for the peak emission wavelength include a range from 50 nm to 50 µm, and a range from 100 nm to 2 µm. When the device is in use, the radiation emitter provides radiation to a target located in the cavity defined by the concave cross section of the first reflector.

In certain embodiments of the invention, the radiation emitter has a single peak emission wavelength. In other embodiments, the radiation emitter has 2 or more peak emission wavelengths, known has a hybrid emitter. In such embodiments, the radiation emitter may have two or more distinct peak emission wavelengths in the IR spectrum. In other embodiments, the radiation emitter may have two or more distinct peak emission wavelengths in the UV spectrum. In another embodiment, the radiation emitter may have one or more peak emission wavelengths in the UV spectrum and one or more peak emission wavelengths in the IR spectrum.

In certain embodiments of the invention, the radiation emitter has a peak emission wavelength in the ultraviolet range. The peak emission wavelength may be selected according to the particular application and, for example, may be selected in order to bring about photo-induced curing and/or photo-induced heating. Exemplary ranges for the peak emission wavelength include a range from 10 to 450 nm, a range from 180 to 450 nm, a range from 190 to 420 nm, and a range from 200 to 400 nm.

In certain embodiments of the invention, the radiation emitter has a peak emission wavelength in the UVA range, and the peak emission wavelength may be selected according to the particular application. Exemplary ranges for the peak emission wavelength include a range from 315 to 400 nm, a range from 320 to 390 nm, and a range from 325 to 380 nm.

In certain embodiments of the invention, the radiation emitter has a peak emission wavelength in the UVB range, and the peak emission wavelength may be selected according to the particular application. Exemplary ranges for the peak emission wavelength include a range from 280 to 315 nm, a range from 285 to 310 nm, and a range from 290 to 305 nm.

In certain embodiments of the invention, the radiation emitter has a peak emission wavelength in the UVC range, and the peak emission wavelength may be selected according to the particular application. Exemplary ranges for the peak emission wavelength include a range from 200 to 280 nm, a range from 210 to 270 nm, and a range from 220 to 260 nm.

In certain embodiments of the invention, the radiation emitter has a peak emission wavelength in the UVV range, and the peak emission wavelength may be selected according to the particular application. Exemplary ranges for the peak emission wavelength include a range from 100 to 220 nm, a range from 110 to 210 nm, and a range from 120 to 200 nm.

In certain embodiments of the invention, the radiation emitter has a peak emission wavelength in the infrared range, and the peak emission wavelength may be selected according to the particular application, and may be selected in order to bring about photo-induced curing and/or photo-induced heating. Exemplary ranges for the peak emission wavelength include a range from 700 nm to 1 mm, a range from 1 μm to 800 μm, and a range from 10 μm to 500 μm.

In certain embodiments of the invention, the radiation emitter has a peak emission wavelength in the near infrared range, and the peak emission wavelength may be selected according to the particular application. Exemplary ranges for the peak emission wavelength include a range from 0.75 to 1.4 μm, a range from 0.8 to 1.3 μm, and a range from 0.85 μm to 1.1 μm.

In certain embodiments of the invention, the radiation emitter has a peak emission wavelength in the short-wavelength infrared range, and the peak emission wavelength may be selected according to the particular application. Exemplary ranges for the peak emission wavelength include a range from 1.4 to 3 μm, a range from 1.5 to 2.8 μm, and a range from 1.6 μm to 2.6 μm.

In certain embodiments of the invention, the radiation emitter has a peak emission wavelength in the mid-wavelength infrared range, and the peak emission wavelength may be selected according to the particular application. Exemplary ranges for the peak emission wavelength include a range from 3 to 8 μm, a range from 3.5 to 6.5 μm, and a range from 4 μm to 7 μm.

In certain embodiments of the invention, the radiation emitter has a peak emission wavelength in the long-wavelength infrared range, and the peak emission wavelength may be selected according to the particular application. Exemplary ranges for the peak emission wavelength include a range from 8 to 15 μm, a range from 9 to 14 μm, and a range from 10 μm to 13 μm.

In certain embodiments of the invention, the radiation emitter has a peak emission wavelength in the visible range, and the peak emission wavelength may be selected according to the particular application, and may be selected in order to bring about photo-induced curing and/or photo-induced heating. Exemplary ranges for the peak emission wavelength include a range from 450 to 750 nm, a range from 475 to 725 nm, and a range from 500 to 700 nm.

The radiation emitting surface is a collection of points on the surface of the radiation emitter from which radiation is emitted. The radiation emitting surface may be extended in 2 dimensions. The radiation emitting surface may be flat or significantly flat. In certain embodiments of the invention, the radiation emitting surface has a surface deviation, as measured by the test method described herein. Exemplary ranges for the surface deviation include a range less than 0.5, a range less than 0.3, a range less than 0.1, a range less than 0.05, and a range less than 0.02.

Radiation emitters may be, for example, surface emitters or array emitters. A surface emitter may have a continuous (or a significantly continuous) radiation emitting surface. An array emitter includes an array of emitters on the radiation emitting surface. Exemplary proportions of the surface area of the radiation emitting surface made up of emitters in an array emitter includes at least 0.5%, at least 1%, at least 2%, at least 3%, at least 5%, at least 10%, at least 20%, and at least 50%. Additional exemplary proportions of the surface area of the radiation emitting surface made up of emitters in an array emitter is at most 95%, at most 90%, at most 70%, at most 50%, at most 20%, and at most 10%. Exemplary emitters for the array are light emitting diodes.

In certain embodiments of the invention, light emitted from the radiation emitter is not fully collimated.

The radiation emitter can be located inside the cavity, outside the cavity or partly inside the cavity. In certain embodiments of the invention, it is preferred for the radiation emitter to be located outside the cavity.

In certain embodiments of the invention, the radiation emitter is located outside the cavity. In embodiments in which the cavity is fully bounded (such as by reflectors), there may be an aperture in the boundary through which radiation from the radiation emitter can enter the cavity.

Exemplary Aspects of the First Reflector

The first reflector reflects radiation emitted by the radiation emitter. The first reflector may have a concave cross section which defines a 2 dimensional cavity. The cross section is taken perpendicular to a length direction. The 2 dimensional cavity is defined as all points located on a straight line between 2 points on the first reflector in the cross section.

In certain embodiments of the invention, the first reflector is curved in the cross section. In further embodiments of the invention (where the first reflector is curved in the cross section), the first reflector does not include any flat sections. In this context, a flat section may be considered a section of 2 cm or more whose tangent vector varies by less than 0.1°.

In certain embodiments of the invention: the first reflector does not include large angle kinks; the first reflector may not include any bends of an angle greater than 45°; the first reflector may not include any bends of an angle greater than 20°; and the first reflector may not include any bends of an angle greater than 10°.

The first reflector may be elongate, extending along a length direction. In certain embodiments, the first reflector has a concave cross section, lying perpendicular to the length direction, which is constant (or approximately constant) along the length direction. The cross sections along the length direction carve out a 3-dimensional cavity. The reflective surface of the first reflector is oriented towards the interior of the cavity (i.e. the cavity is at least partially bordered by a reflective surface).

The invention is primarily described in terms of a 2-dimensional cross section; however, it is not limited thereto. That is, the invention may also be described in 3-dimensional terms. For example, where a substantially circular focal area is present in the 2-dimensional cross section, this might generalize in 3 dimensions to what is substantially a cylinder extending along the length direction. In the following description, reference to the cavity is specifically to the 2-dimensional cavity within the cross section defined by the first reflector.

The first reflector may have a shape which favors the formation of a focal area in the cavity, when arranged in combination with the radiation emitter. To this end, the first reflector may not have a precise focal point.

In certain embodiments of the invention, the shape of the first reflector is not selected from the list consisting of: a circle; an ellipse; a parabola; and a hyperbola. Further, for example, the shape of the first reflector is not a segment taken from any of: a circle, an ellipse, a parabola or a hyperbola.

The shape of the first reflector may be selected by the skilled person to achieve the desired intensity distribution. One exemplary technique which may be used to select the shape of the first reflector is to design it using an optical simulation package. The simulation package can be used to design a first reflector which in combination with the radiation emitter provides a focal area suitable for the intended application.

In certain embodiments of the invention, the first reflector is piecewise constructed of multiple sections, at least one of which is (and all of which may be) a conic section. For example, the first reflector may be piecewise constructed of multiple sections, at least one of which is (and all of which may be), a segment of: a circle; an ellipse; a parabola; or a hyperbola. Exemplary ranges for the number of segments included in the first reflector are: 2 to 1000 segments; 10 to 800 segments; 20 to 700 segments; and 30 to 600 segments. At least one of the segments of the first reflector (up to, including, all of the segments included in the first reflector) may be: a circle; an ellipse; a parabola; or a hyperbola. In embodiments of the invention where the first reflector is constructed to include two or more conic sections, two or more of such conic sections (and perhaps all of such conic sections) may have different conic parameters.

In embodiments of the invention where the first reflector is constructed from two or more conic sections, the first reflector does not necessarily have a clearly distinguished focal point, although each of the conic sections from which it is constructed might have a clearly distinguished focal point.

Exemplary Aspects of the Intensity Distribution

The radiation emitter and the first reflector may be arranged in such a manner that the radiation emitter is capable of supplying radiation to the cavity of the first reflector with an intensity distribution I. The intensity distribution I is constituted of both light arriving directly from the radiation emitter and light arriving indirectly having been reflected by the first reflector and/or other reflector(s). In certain embodiments of the invention, the radiation emitter has a single peak emission wavelength and the intensity I is determined at the peak emission wavelength. In other exemplary embodiments, the radiation emitter is a hybrid emitter having 2 or more peak emission wavelengths (e.g., 2-5 peak emission wavelengths, 2-3 peak emission wavelengths, 2 peak emission wavelengths, etc.). The intensity I is determined as the sum of intensities at the 2 or more peak emission wavelengths.

The distribution I has a maximum value $I_{max}$ within the cavity area. The value of $I_{max}$ can be selected in accordance with the specific application. Exemplary ranges for the value of $I_{max}$ are: from 0.01 W/cm$^2$ to 1000 W/cm$^2$; from 0.1 W/cm$^2$ to 100 W/cm$^2$; and from 0.5 W/cm$^2$ to 50 W/cm$^2$. In some cases, $I_{max}$ can be on the order of several kW/cm$^2$.

Exemplary Aspects of the Focal Area

The radiation emitter and the first reflector may be arranged in such a manner than the intensity distribution I in the cavity area exhibits a focal area satisfying the requirements of one or more embodiments of the invention.

The focal area includes those points in the cross section at which the radiation intensity is above a threshold value. Exemplary threshold values include: 20% of the maximum intensity $I_{max}$ in the cavity area; 60% of the maximum intensity $I_{max}$ in the cavity area; and 80% of the maximum intensity $I_{max}$ in the cavity area.

Exemplary absolute value ranges for the area of the focal area include: 0.4 to 5000 mm$^2$; 0.5 to 2500 mm$^2$; and 1 to 50 mm$^2$.

Exemplary ranges for the proportions of the focal area to the total area of the cavity area include: the focal area having an area which as a proportion of the total area of the cavity area is in a range of 0.00000001 to 0.30; the focal area having an area which as a proportion of the total area of the cavity area is in a range of 0.000001 to 0.05; and the focal area having an area which as a proportion of the total area of the cavity area is in a range of 0.0001 to 0.005.

In certain embodiments of the invention, the focal area has a width in a range. The width of the focal area runs between the boundaries of the focal area and passes through the point of maximum intensity $I_{max}$. The width runs perpendicular to the line of shortest distance between the point of maximum intensity $I_{max}$ and the emitting surface of the radiation emitter. In this context, the width of the cavity area is determined along the same line, but has at its endpoints the two points on the first reflector which lie at the boundary of the cavity area.

Exemplary ranges for the width of the focal area are: 0.01 mm to 100 cm; 0.1 mm to 50 cm; and 1 mm to 10 cm.

An exemplary range for the area of the focal area is 50 to 5000 mm$^2$.

Exemplary Aspects of Further Reflectors

The device may include one or more further reflectors (in addition to the first reflector).

In certain embodiments of the invention, the device includes a further reflector bordering the perimeter of the cavity area defined by the first reflector. Such a further reflector may be flat, or substantially flat. This further reflector may serve as an end reflector and may be positioned to reflect light which has already been reflected by another reflector. In certain embodiments of the invention, the cavity area is fully bounded by the first reflector, the further (end reflector) and the radiation emitter. In certain embodiments of the invention, the further reflector defines an aperture through which radiation from the radiation emitter can pass, for example, with the radiation emitter being located outside the cavity and providing radiation to the cavity via the aperture.

In certain embodiments of the invention, the device includes one or more further reflectors oriented perpendicular to the length direction of the first reflector. These reflectors may serve to reflect radiation which would otherwise exit the 3-dimensional cavity defined by the first reflector. For example, the 3-dimensional cavity defined by the first reflector may be fully bounded by the reflectors and the radiation emitter present in the cross section and further reflectors perpendicular to the length direction.

Exemplary Aspects of Apertures in the Reflectors

Apertures may be present in the any of the reflectors. As already described above, one or more apertures may be present to allow radiation from the radiation emitter to enter the cavity. Furthermore, apertures may be present for the purpose of allowing air flow for cooling.

In certain embodiments of the invention, the 2-D cavity in the cross-section is fully bounded, apart from a small amount of apertures for air flow. Exemplary ranges for the total proportion of the perimeter of the cavity which is not bounded include: less than 10% of the perimeter of the cavity; less than 5% of the perimeter of the cavity; less than 1% of the perimeter of the cavity; less than 0.5% of the perimeter of the cavity; and less than 0.1% of the perimeter of the cavity.

In certain embodiments of the invention, the 3-D cavity is fully bounded apart from a small amount of apertures for air flow and entrances for the target to be introduced into and removed from the cavity, for example, apertures for feeding a fiber. Exemplary ranges for the total proportion of the area of the 3-D cavity which is not bounded include: less than 10% of the area of the 3-D cavity; less than 5% of the area of the 3-D cavity; less than 1% of the area of the 3-D cavity; less than 0.5% of the area of the 3-D cavity; and less than 0.1% of the area of the 3-D cavity.

The device may include one or more air ducts, for example, present in one or more reflector(s).

Exemplary Aspects of Optics

Optical elements may be utilized to alter the radiation emitted from the radiation emitter. Any optical element which the skilled person considers suitable may be utilized. Exemplary optical elements include one or more of: a lens; a grating; and a filter.

In certain embodiments of the invention, an optical element (e.g., a lens, a reflector, etc.) is utilized for deviating the path of the radiation emitted from the radiation emitter. This deviation may be an increase or reduction in the divergence, or an increase or reduction in the collimation, or both.

In certain embodiments of the invention, the optical element includes a single lens. The single lens may lie over one or more of the radiation emitters on the radiation emitter surface (e.g., one or more emitters, two or more emitters, all of the emitters on the emitter surface). Further, such a lens (or lenses) may be integral with the radiation emitter.

In other embodiments of the invention, the optical element includes more than one lens. In such embodiments, each radiation emitter on the radiation emitter surface may have an individual lens over it.

Exemplary Aspects of Means for Moving the Target

The device may include a positioning system for moving a target relative to the radiation emitter. The movement of the target may be along the length direction of the first reflector. An exemplary positioning system for moving the target is a cable feeder (e.g., a glass fiber feeder).

Exemplary Aspects of the Target

The target may be any object for which it is desired to apply radiation. The target may be elongate, for example, with exemplary aspect ratios being: at least 2; at least 5; at least 10; at least 20; and at least 100. The aspect ratio may be defined as the largest dimension divided by the largest dimension perpendicular to the largest dimension. In some cases, the aspect ratio can be as high as around 1 million or more (e.g., where the target is a fiber).

The target may be narrow, with exemplary ranges of the second largest dimension being: less than 10 cm; less than 1 cm; less than 5 mm; less than 1 mm; and less than 500 µm. The second largest dimension is the largest dimension perpendicular to the largest dimension. Suitable targets may be flexible or stiff.

In certain embodiments of the invention, the target is cylindrical (or approximately cylindrical). In such embodiments, the target may be elongate and/or narrow. Exemplary objects for the target include: needles; pens; rods; wires; and fibers. Exemplary fibers are optical fibers and textile fibers. Exemplary textile fibers include: polymer fibers; metallic fibers; and biological fibers. Exemplary biological fibers are cellulose and silk. Exemplary optical fibers include: polymer fibers; photonic fibers; glass fibers; and metallic hollow fibers.

In certain embodiments of the invention, the target is anisotropic in cross-section, such as an elongate target having an anisotropic cross-section. An exemplary target in this context is a ribbon. Such a ribbon may be formed, for example, of two or more (e.g., two or more, three or more, five or more, etc.) cylindrical or substantially cylindrical members arranged in a row. The members may be in direct contact, or indirect contact, for example, with individually coated members which are adhered together. The members may be further coated as a whole.

In certain embodiments of the invention, the target is anisotropic and the focal area of the device is also anisotropic, for example, as described for an anisotropic focal area herein. For example, the aspect ratio of the focal area in the cross section and the aspect ratio of the target in the cross section may be similar. Exemplary ranges for the aspect ratio of the focal area in the cross section divided by the aspect ratio of the target in the cross section include: a range from 0.2 to 5; a range from 0.3 to 3; a range from 0.6 to 1.5; a range from 0.8 to 1.3; and a range from 0.9 to 1.1.

In certain embodiments of the invention, the target may be made of 2 or more (e.g., two or more, three or more, five or more, etc.) glass fibers arranged in a ribbon. In other exemplary embodiment, the fiber might include, for example: 1 to 50 fibers; 3 to 30 fibers; or 5 to 15 fibers. In some cases, up to about 100 fibers or more might be arranged as a ribbon. Other ribbons might be made of 2 or more substantially cylindrical targets, such as wires, cables, or threads.

Exemplary Aspects of Treatment

The application of radiation to a target desirably effects a treatment at the surface of the target, for example, to a coating on the surface of the target. The peak emission wavelength of the radiation emitter may be tuned according to the specific treatment desired. Exemplary treatments include one or more of the following: heating; sintering; curing; reacting; melting; and drying.

Exemplary coatings include one or more of the following: polymer coatings; metal coatings; ceramic coatings; glass coatings; silicone coating; liquid coatings; granular coatings; imprint coatings; ink coatings; adhesive coatings; and powder coatings. Exemplary polymer coatings are acrylic or polyurethane based coatings. In the case of a polymer coating, the applied radiation may initiate a polymerization reaction in a precursor coating to obtain a polymer coating. An exemplary radiation for treating a polymer coating is UV light.

Exemplary Aspects of Applications

This device of the invention may be utilized for applying radiation in a number of industrially useful applications, for example: providing color coatings and/or protective coatings, for example, to fibers, wires or cables.

Exemplary Aspects of the Treatment of Fiber

In certain embodiments of the invention, the device is utilized for surface treatment of a fiber, such as a glass fiber or a polymer fiber. In this context, the fiber may be passed through the device in the length direction such that the fiber passes through the focal area. For example, the fiber may pass through the focal area along a path extended along the length direction. For example, the focal area may extend along the length direction to constitute a focal cylinder and the fiber may pass through the cylinder. In a specific example, the fiber may pass through a hollow target tube (e.g., a cylindrical, or substantially cylindrical, target tube). The target tube may be transparent to a peak emission wavelength of the emitter. The target tube may be formed of, for example, quartz glass.

Description of the Drawings

The invention is now further described in connection with the drawings. These figures are to serve as an aid to understanding and are not to be interpreted as limiting the scope of the invention. Like elements throughout the various drawings are illustrated with the same number.

FIG. 1 is a schematic illustration of a cross section of a first reflector 101. First reflector 101 is concave and defines a cavity area 102 in its interior. Cavity area 102 is defined as all points which are positioned between 2 points on first reflector 101. One such point 103 is marked with "x" in FIG. 1. Point 103 lies between the points 104 and 105 of first reflector 101.

Figure 2:
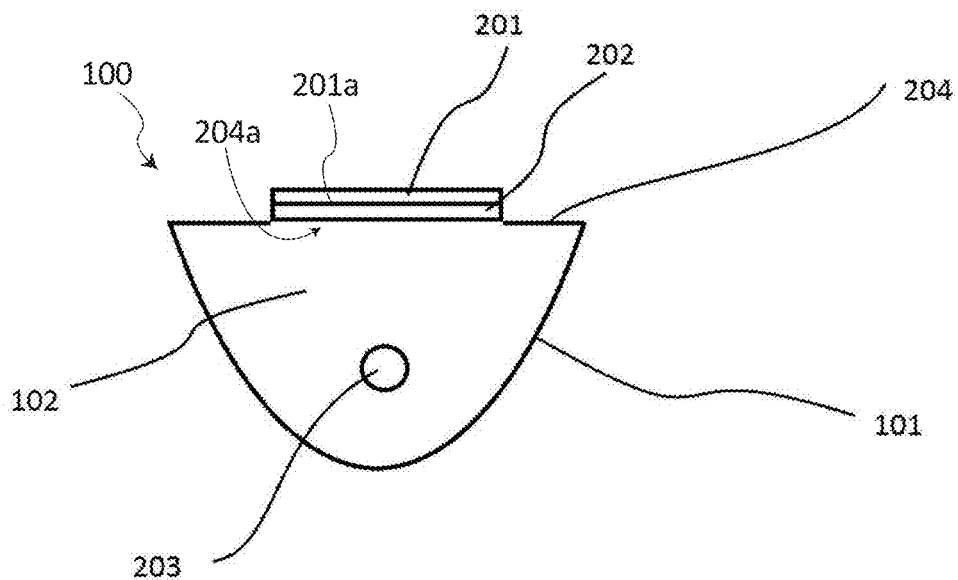
FIG. 2 is a cross section of a device including the first reflector of FIG. 1 in accordance with an exemplary embodiment of the invention.

FIG. 2 is a schematic illustration of a cross section of a device 100. Device 100 includes first reflector 101 which is concave and defines cavity area 102 in its interior. A perimeter of device 100 is completed by a flat reflector 204 having an aperture 204a. Adjacent aperture 204a is positioned a radiation emitter 201 (including a radiation emitting surface 201a) having an attached (or integral) lens 202 to alter the divergence of the emitted radiation from radiation emitter 201. In this configuration, radiation emitter 201 provides radiation to cavity area 102 such that a focal area 203 is produced in cavity area 102.

Figure 3:
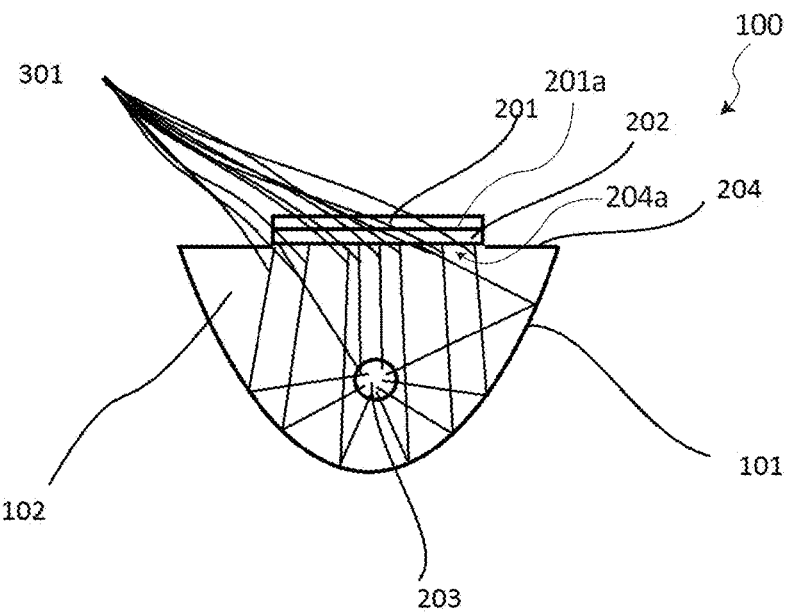
FIG. 3 is another cross section of the device of FIG. 2.

FIG. 3 is a schematic cross section of device 100. First reflector 101 is concave and defines cavity area 102 in its interior. The perimeter of device 100 is completed by flat reflector 204 having aperture 204a. Radiation emitting surface 201a of radiation emitter 201 is positioned adjacent aperture 204a, where radiation emitter 201 has an attached (or integral) lens 202 to alter the divergence of the emitted radiation. In this configuration, radiation emitter 201 provides radiation to cavity area 102 such that focal area 203 is produced in cavity area 102. 8 electromagnetic radiation rays 301 are shown emerging from the lens 202 in FIG. 3. The middle 2 rays arrive at focal area 203 directly. The 6 other rays arrive at focal area 203 after one reflection from the first reflector 101. The rays 301 do not all pass through the center of the focal area 203.

Figure 4:
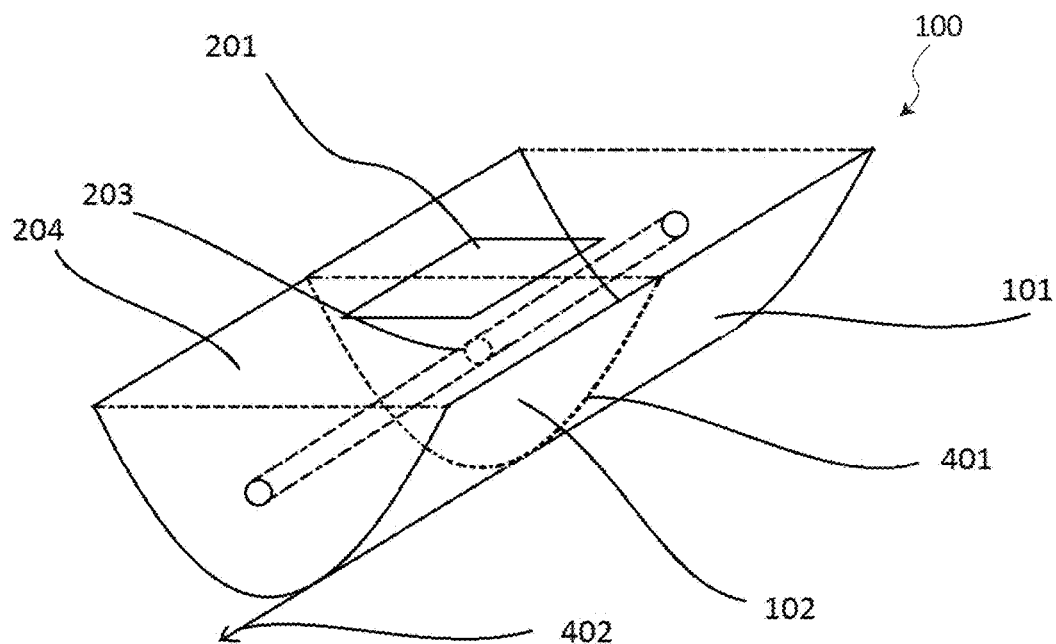
FIG. 4 is a perspective view of the device of FIG. 2.

FIG. 4 illustrates device 100 in a perspective view. The cross section 401 is described in connection with FIGS. 1-3. Cavity 102, defined by first reflector 101, defines a 3-dimensional cavity when cross section 401 is translated along the length direction 402. Focal area 203 defines a cylinder when translated along length direction 402. Flat reflector 204 extends along the length direction 402 and the radiation emitter 201 also extends to some extent along the length direction 402. In other variants, the radiation emitter 201 might extend along the entire length or alternatively there might be 2 or more radiation emitters positioned along length 402. In use, a target (e.g., a fiber) is translated along the cylindrical focal region 203, where it is exposed to radiation from radiation emitter 201.

Figure 5A:
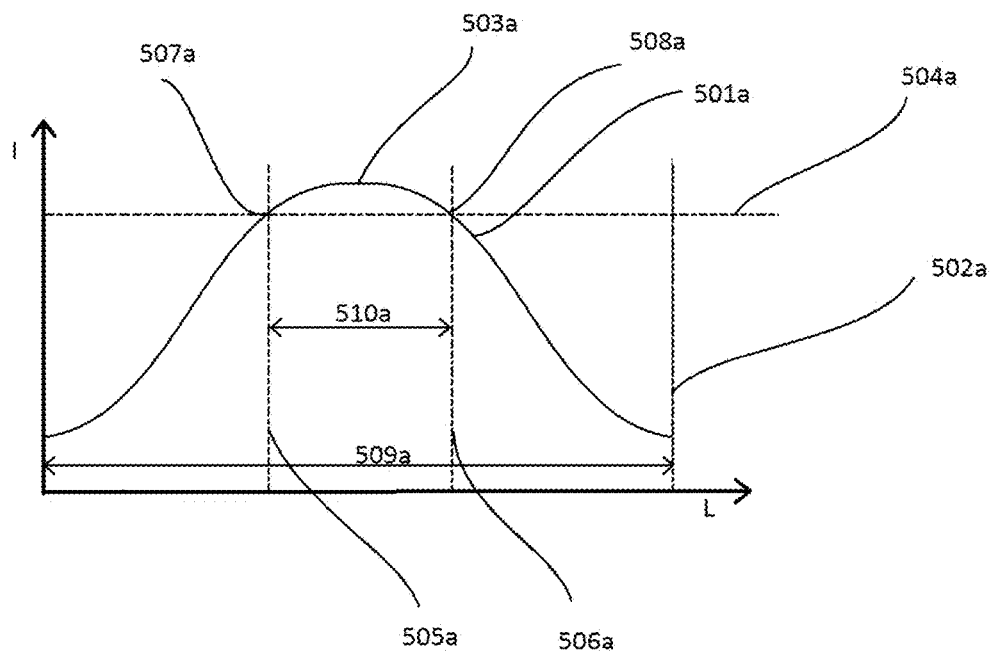
FIGS. 5A-5C are schematic illustrations of three exemplary distributions of intensity along a straight line in the cross section perpendicular to the reflector's length dimension in accordance with an exemplary embodiment of the invention.
Figure 5B:
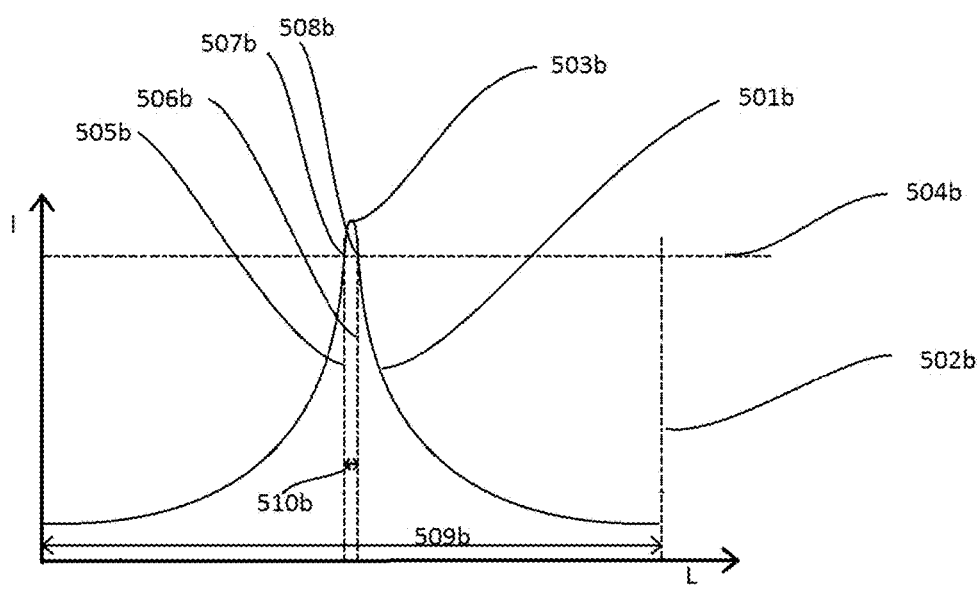
Figure 5C:
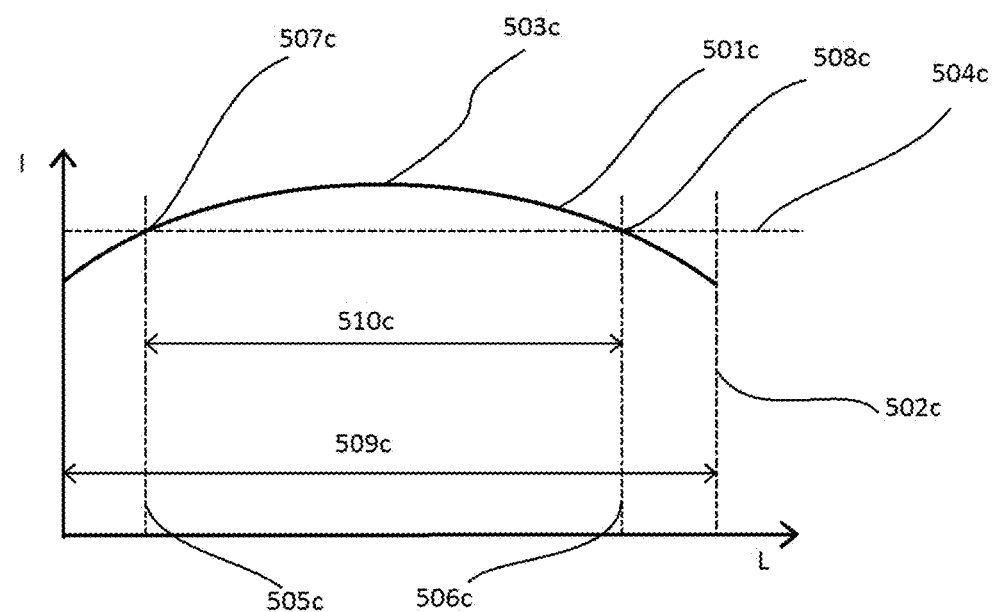

FIGS. 5A-5C illustrate schematically three exemplary distributions of intensity along a straight line in the cross section perpendicular to the reflector's length dimension. The line runs between two points on first reflector 101, through the point of maximum intensity $I_{max}$ in the focal area. The line is thus contained in cavity area 102.

In FIG. 5A, the I-axis and the line 502a mark the boundaries of the cavity area 102 (i.e., the end points of the straight line on first reflector 101) (compare 104 and 105 in FIG. 1). Line 501a represents the intensity distribution along the straight path between the two end points on first reflector 101. The intensity 501a has its maximum value $I_{max}$ at the point 503a. The line 504a marks the cut off intensity as a proportion of $I_{max}$. The intensity distribution meets the intensity cut off at points 507a and 508a. Therefore all points between the vertical lines 505a and 506a, which run through 507a and 508a respectively, are defined as belonging to focal area 203. The width of focal area 203, indicated by the line 510a is around 30% of the total length of the line 509a.

In FIG. 5B, the I-axis and the line 502b mark the boundaries of the cavity area 102 (i.e., the end points of the straight line on first reflector 101) (compare 104 and 105 in FIG. 1). Line 501b represents the intensity distribution along the straight path between the two end points on first reflector 101. The intensity 501b has its maximum value $I_{max}$ at the point 503b. The line 504b marks the cut off intensity as a proportion of $I_{max}$. The intensity distribution meets the intensity cut off at points 507b and 508b. Therefore, all points between the vertical lines 505b and 506b, which run through 507b and 508b respectively, are defined as belonging to focal area 203. The width of focal area 203, indicated by the line 510b is in the illustrated case around 4% of the total length of the line 509b. An intensity distribution in which focal area 203 is tighter in proportion to the dimensions of first reflector 101 behaves more like a system with a focal point. A device in which the focal area is too small will fall outside the range contemplated in the context of the invention.

In FIG. 5C, the I-axis and the line 502c mark the boundaries of the cavity area 102 (i.e., the end points of the straight line on first reflector 101) (compare 104 and 105 in FIG. 1). Line 501c represents the intensity distribution along the straight path between the two end points on first reflector 101. The intensity 501c has its maximum value $I_{max}$ at the point 503c. The line 504c marks the cut off intensity as a proportion of $I_{max}$. The intensity distribution meets the intensity cut off at points 507c and 508c. Therefore, all points between the vertical lines 505c and 506c, which run through 507c and 508c respectively, are defined as belonging to focal area 203. The width of focal area 203, indicated by the line 510c is in the illustrated case around 80% of the total length of the line 509c. An intensity distribution in which focal area 203 is broader in proportion to the dimensions of first reflector 101 behaves more like a non-focusing system. A device in which the focal area is too large will fall outside the range contemplated in the context of the invention.

Figure 6:
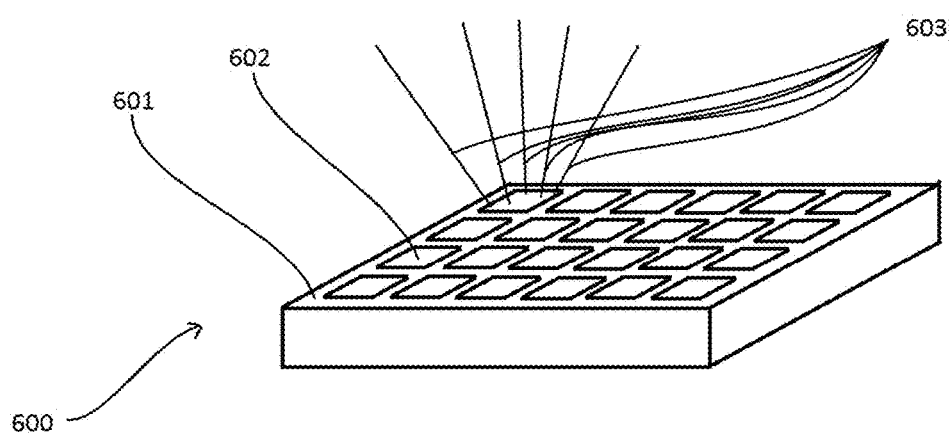
FIG. 6 is a perspective view of an array type radiation emitter in accordance with an exemplary embodiment of the invention.

FIG. 6 illustrates a radiation emitter 600 of the array type. Radiation emitter 600 has an radiation emitting surface 601. On the radiation emitting surface 601 is an array of emitters 602, in this case UV LEDs. Each emitter 602 emits radiation 603, shown here for a single emitter 602.

Figure 7:
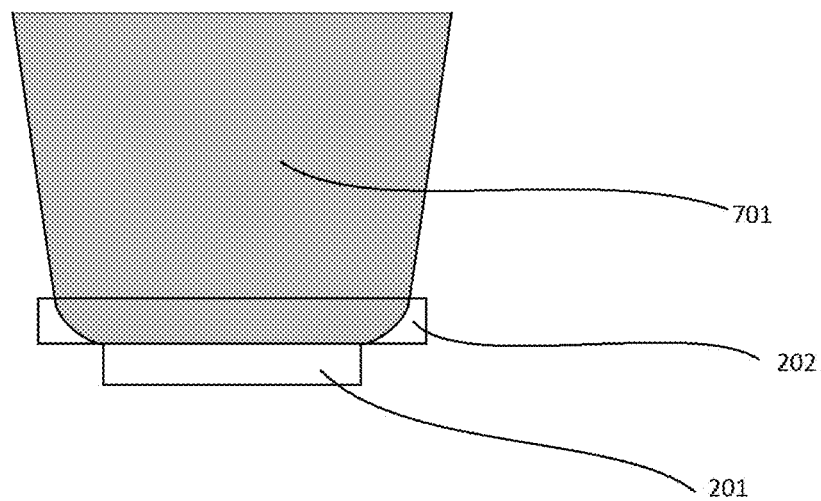
FIG. 7 is a schematic illustration of a radiation emitter in accordance with an exemplary embodiment of the invention.

FIG. 7 shows a radiation pattern 701 schematically. Light 701 emitted from the radiation emitter 201 passes through refractive optics 202 which alter the divergence of the emitted radiation.

Figure 8:
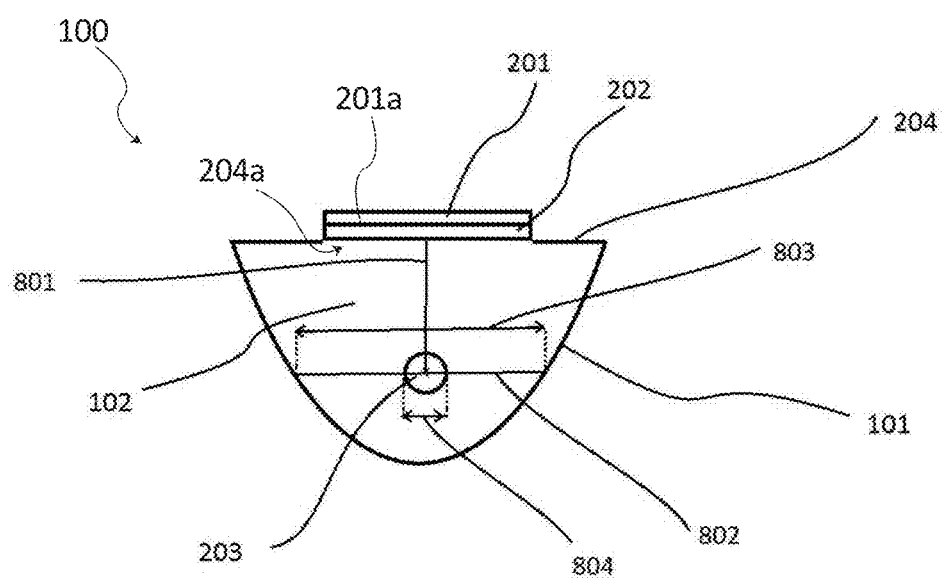
FIG. 8 is a schematic illustrating widths of a focal area and a cavity area of the device of FIG. 2 in accordance with an exemplary embodiment of the invention.

FIG. 8 illustrates exemplary widths of focal area 203 and of cavity area 102, schematically. The line 801 is the shortest line between $I_{max}$ and the emitter surface. The line 802 runs perpendicular to 801 and passes through $I_{max}$. Both the width 804 of the focal area 203 and the width 803 of the cavity area 102 are determined along 802.

Figure 9A:
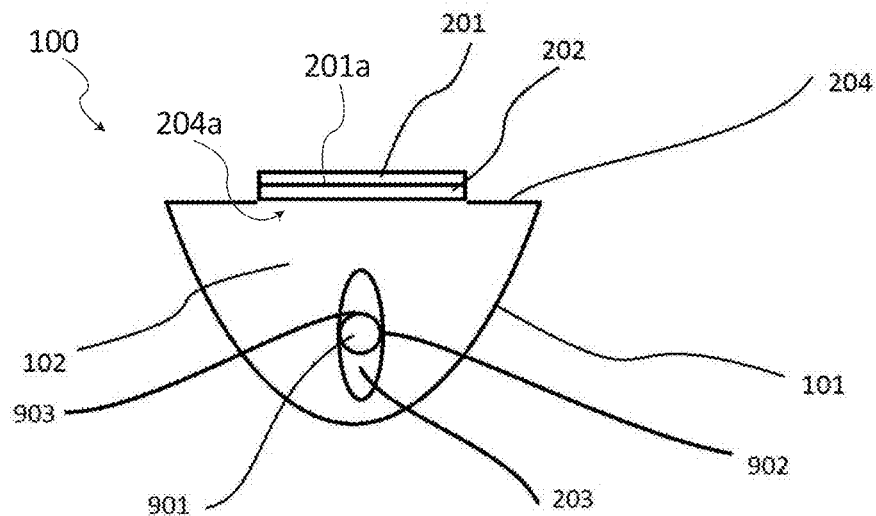
FIG. 9A illustrates the device of FIG. 2 in which the focal area is contracted along its width to give an ellipse in accordance with an exemplary embodiment of the invention.

FIG. 9A shows a device 100 in which focal area 203 is contracted along its width to provide an ellipse. In this case, a circle 901 centered on $I_{max}$ and having the same width as the focal area 203 lies inside focal area 203. The point 902 on the circumference of the circle lies on the border of focal area 203. The point 903 on the circumference of the circle lies within focal area 203. Point 903 has a higher intensity than point 902.

Figure 9B:
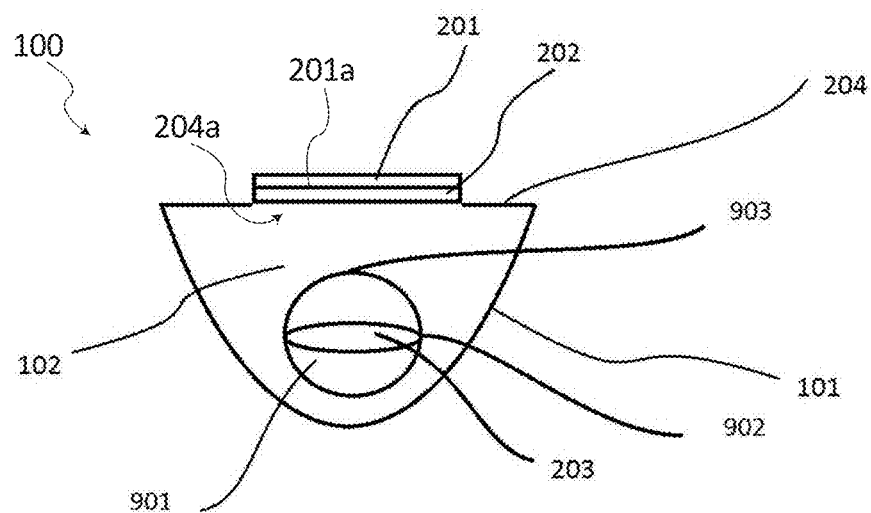
FIG. 9B illustrates the device of FIG. 2 in which the focal area is extended along its width to give an ellipse in accordance with an exemplary embodiment of the invention.

FIG. 9B shows a device 100 in which focal area 203 is extended along its width to provide an ellipse. In this case, a circle 901 centered on $I_{max}$ and having the same width as focal area 203 contains focal area 203. The point 902 on the circumference of the circle lies on the border of focal area 203. The point 903 on the circumference of the circle lies outside focal area 203. Point 903 has a lower intensity than point 902.

Figure 10:
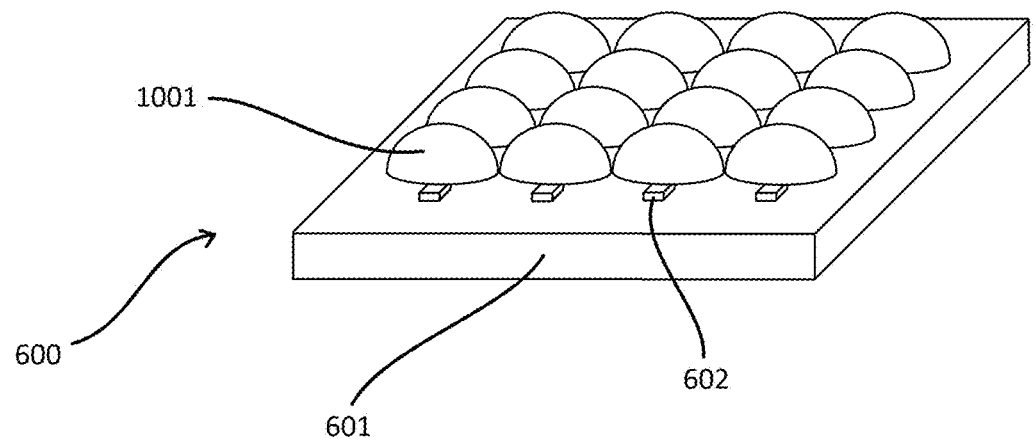
FIG. 10 illustrates an array emitter in which LEDs are positioned in an array in accordance with an exemplary embodiment of the invention.

FIG. 10 illustrates an array emitter 600 in which LEDs 602 are positioned in an array. Each LED 602 has a hemispherical lens 1001 above it with the convex side facing away from the LED 602. In this case, the hemispheres span the distance between the array points and thus are in contact with each other.

Figure 11:
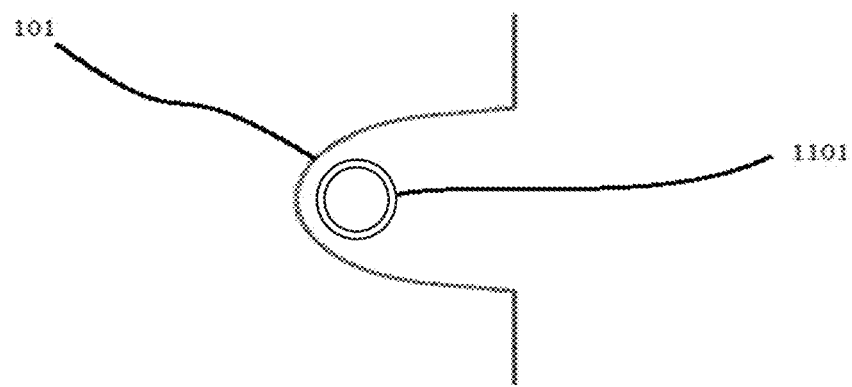
FIG. 11 is diagram illustrating an exemplary shape for a first reflector and also an exemplary position of a target tube relative to the first reflector in accordance with an exemplary embodiment of the invention.

FIG. 11 is a scale diagram showing an exemplary shape for first reflector 101 and also showing an exemplary position of a target tube 1101 relative to first reflector 101.

Exemplary Test Methods

Radiation Intensity: Radiation intensity may be measured, for example, using a measuring device including a waveguide, a detector, a translation system and a data acquisition system.

EXAMPLES

Exemplary Device: A device 100 was provided according to the configuration shown in FIG. 4. In the cross section, first reflector 101 had a 15 cm long reflector face and a width about focal area 203 of 10 cm. Flat reflector 204 had a length of 15 cm and a constant cross section along its length. The perimeter of cavity area 102 in the cross section was closed with flat reflector 204 which bounded cavity area 102 and extended along the entire length of first reflector 101. Flat reflector 204 was provided with an aperture 204a (see FIGS. 2-3) through which radiation from radiation emitter 201 could enter cavity area 102. Both ends of the 3-dimensional cavity area 102 were bounded by other flat reflectors having apertures for the target to pass through. Radiation emitter 201 was a 4.5 cm by 15 cm LED array having a peak emission wavelength of 395 nm and 3.5 LED per $cm^2$ in a square matrix positioned at the mid point of the 10 m length of device 100 with the longest dimension of radiation emitter 201 being parallel to the longest dimension of first reflector 101. Each LED had a 2 mm diameter semispherical lens above it with the convex side facing away from the LED. The power output of the emitter was 1 W/LED. Radiation emitter 201 was arranged outside cavity area 102 and oriented such that the emitted radiation passed through aperture 204a of flat reflector 204 into cavity 102. Lens 202 was fitted to radiation emitting surface 201a of radiation emitter 201 in order to alter the divergence of the emitted radiation. The size and shape of radiation emitter 201 and aperture 204a in flat reflector 204 were matched so that cavity area 102 was fully bounded in the cross section. Similarly, the end reflectors bounded the perpendicular face of the 3-dimensional cavity, save for the apertures for the target to enter. Cavity area 102 was provided with a 1 mm thick hollow cylindrical quartz glass tube having a 2.1 cm interior diameter along its 2 m extension. The axis of the quartz glass tube was at the point of maximum intensity $I_{max}$ in the cross section of the device. Device 100 was mounted on an OFC Fiber Draw Tower available from Nextrom. The LED device was cooled and maintained at a temperature below 80° C. using dc fans from Orion or Cooltron (Model FD8038B).

Curing: A >10 km long glass fiber of diameter 125 μm was coated with PhiChem® KG100 and passed through device 100 at a speed of 2000 m/min with radiation emitter 201 on to obtain a singly coated fiber of diameter 185 μm. The singly coated fiber was then coated with PhiChem® KG200 and passed through device 100 at a speed of 2000 m/min with radiation emitter 201 on to obtain a doubly coated fiber of diameter 245 μm.

Minimum LED Power Usage: A proportion of the LEDs were deactivated until the minimum number which allowed for adequate curing of the coating layer. The LEDs were deactivated in a symmetrical manner. The minimum LED power usage required for adequate curing, i.e. photopolymerization, in each example is shown in Table 2.

Although the invention is illustrated and described herein with reference to specific embodiments, the invention is not intended to be limited to the details shown. Rather, various modifications may be made in the details within the scope and range of equivalents of the claims and without departing from the invention.

REFERENCE LIST

101 First reflector
102 Cavity area
103 Point in cavity area
104 Point on first reflector
105 Point on first reflector
201 Radiation emitter
202 Refractive optics
203 Focal area
204 Further reflector
301 Ray emitted from radiation emitter
401 Cross section
402 Length direction
501a/b/c Intensity distribution
502a/b/c Cavity edge
503a/b/c Imax
504a/b/c Intensity cut off for focal area
505a/b/c Edge of focal area
506a/b/c Edge of focal area
507a/b/c Edge of focal area
508a/b/c Edge of focal area
509a/b/c Width of cavity
510a/b/c Width of focal area
600 array type radiation emitter
601 radiation emitting surface
602 individual emitter
603 emitted ray
701 Emitted light
1101 Target tube

What is claimed:

1. A device for applying radiation to a target, the device comprising:
    a radiation emitter configured to emit electromagnetic radiation having a peak emission wavelength in the range from 10 nm to 1 mm from a radiation emitting surface of the radiation emitter; and
    a first reflector that extends in a length direction and has a concave cross section perpendicular to the length direction, the first reflector defining a cavity area having a perimeter, the first reflector having an inward facing reflective border for at least 50% of the perimeter of the cavity area,
    wherein the radiation emitting surface is oriented so as to provide radiation to the cavity area with an intensity distribution I and a maximum intensity $I_{max}$,
    wherein the cavity area includes a focal area defined by all points at which a normalized intensity $I/I_{max}$ is greater than 0.2,
    wherein a width of the focal area is 0.0001 to 0.5 times a width of the cavity area, and
    wherein the width of the focal area and the width of the cavity area are determined along a line passing through a point of maximum intensity $I_{max}$ and which is parallel to a line joining two end points of the radiation emitting surface of the radiation emitter.

2. The device of claim 1 wherein an area of the focal area is 0.00000001 to 0.30 times that of the cavity area.

3. The device of claim 1 wherein an area of the focal area is in a range of 1-3000 mm$^2$.

4. The device of claim 1 wherein a width of the focal area is in a range of 0.01-50 mm.

5. The device of claim 1 wherein for a circle centered at a point of $I_{max}$ and having a diameter equal to the width of the focal area, a minimum value of intensity on a circumference of the circle divided by a maximum value of intensity on the circumference of the circle is at least 0.2.

6. The device of claim 1 further comprising a further reflector which provides an inward facing reflective border to part of the perimeter of the cavity area.

7. The device of claim 6 wherein the further reflector defines an aperture, wherein the radiation emitter is located outside the cavity area and the radiation emitting surface is oriented toward the aperture.

8. The device of claim 1 further comprising a target chamber having a target chamber wall, wherein the target chamber wall is transparent to a peak emission wavelength of the radiation emitter, wherein at least 50% of the focal area is included in the target chamber.

9. The device of claim 8 wherein the focal area is completely included in the target chamber.

10. The device of claim 9 wherein at least one of (i) an inert gas, and (ii) a flow of an inert gas, is provided in the target chamber.

11. The device of claim 1 further comprising one or more air ducts in the perimeter of the cavity area.

12. The device of claim 1 wherein the normalized intensity $I/I_{max}$ in the cavity area has a maximum gradient of less than 1 per mm.

13. The device of claim 1 wherein the normalized intensity $I/I_{max}$ in the focal area has a maximum gradient of less than 0.5 per mm.

14. The device of claim 1 wherein a peak emission wavelength of the radiation emitter is in a range of 170-450 nm.

15. The device of claim 1 wherein a peak emission wavelength of the radiation emitter is in a range of 700 nm-1 mm.

16. The device of claim 1 wherein the radiation emitter includes an array of at least four radiation emitters.

17. The device of claim 1 wherein the radiation emitter includes refractive optics to alter the divergence of radiation emitted from the radiation emitting surface.

18. The device of claim 1 further comprising one or more reflectors perpendicular to the length direction of the first reflector.

19. The device of claim 1 further comprising a motion system for moving a target relative to the radiation emitter.

20. A method of applying radiation to a target, the method comprising the steps of:
    (a) introducing a target into the device of claim 1; and
    (b) applying radiation to the target using the radiation emitter.

* * * * *